Jan. 11, 1938.    A. L. W. WILLIAMS    2,105,011
PIEZOELECTRIC APPARATUS
Original Filed April 14, 1934    3 Sheets-Sheet 1
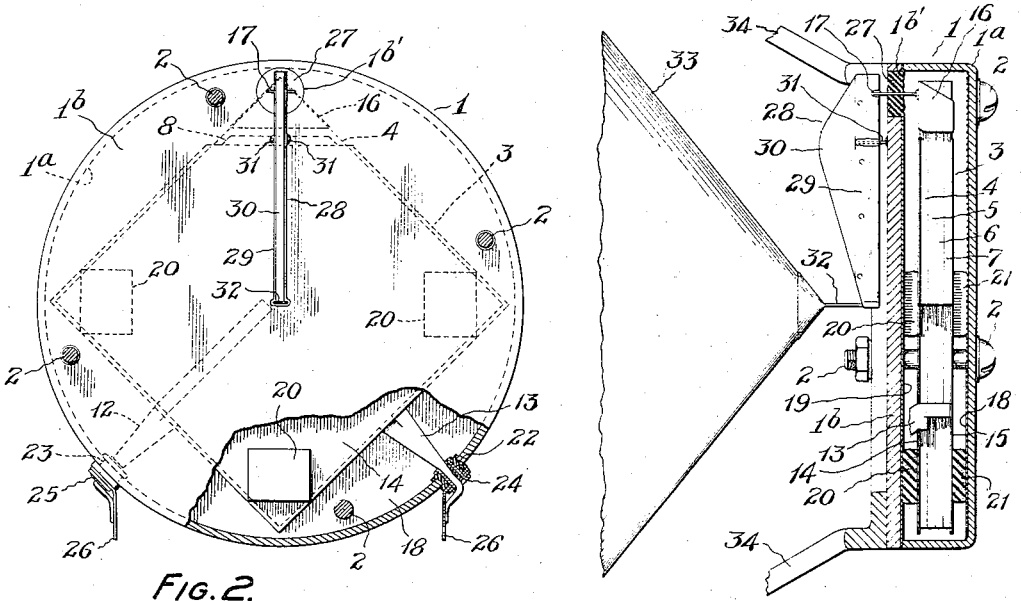
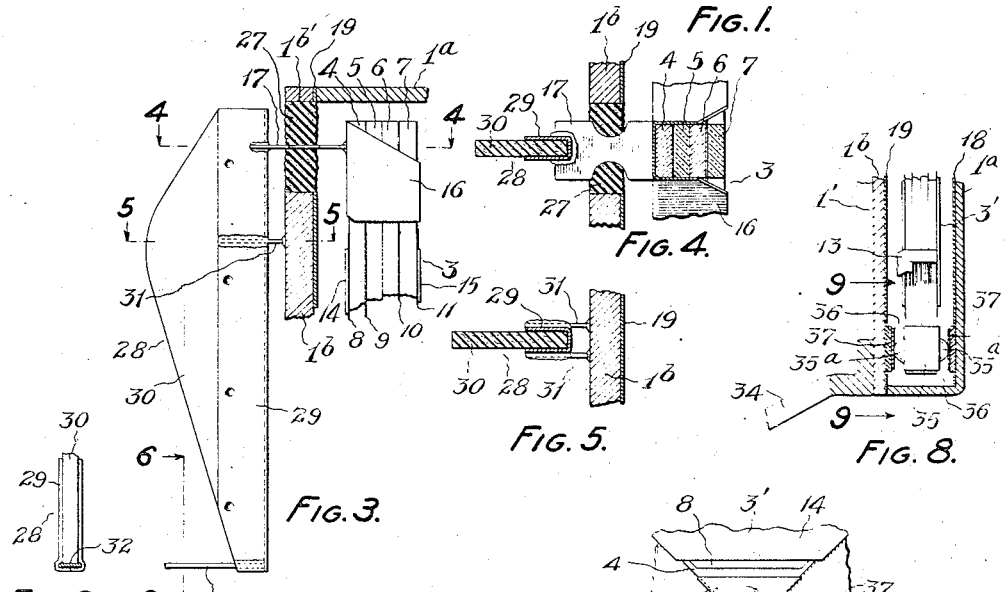
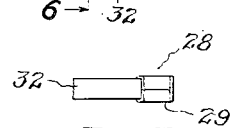
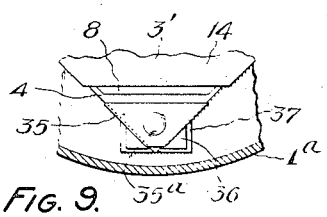
INVENTOR:
Alfred L. W. Williams
Roy N. Kehr
ATTORNEY

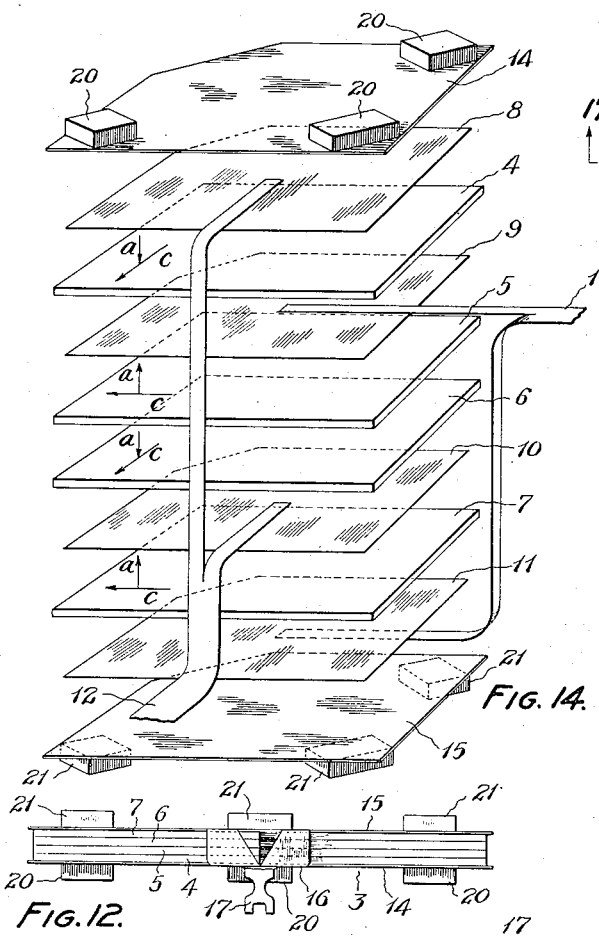
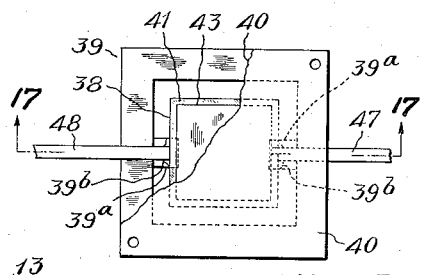
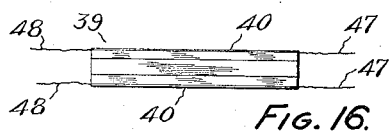
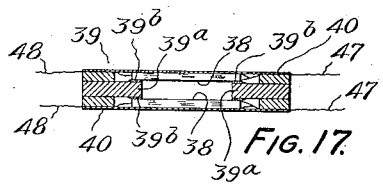
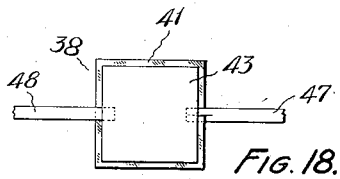
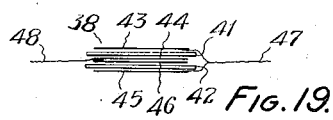
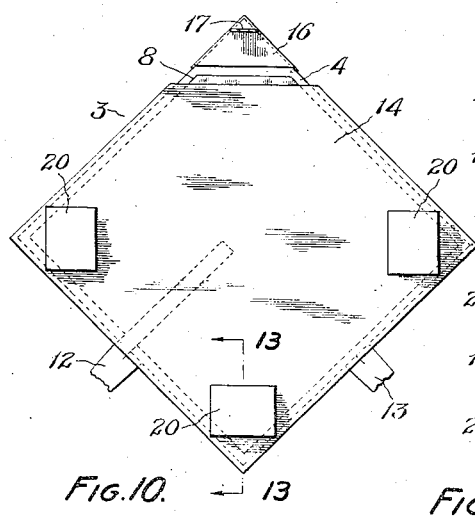
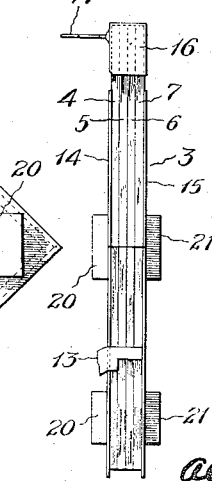
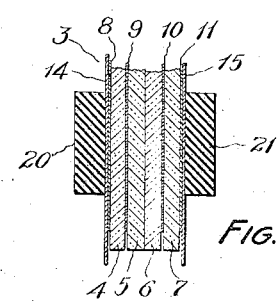

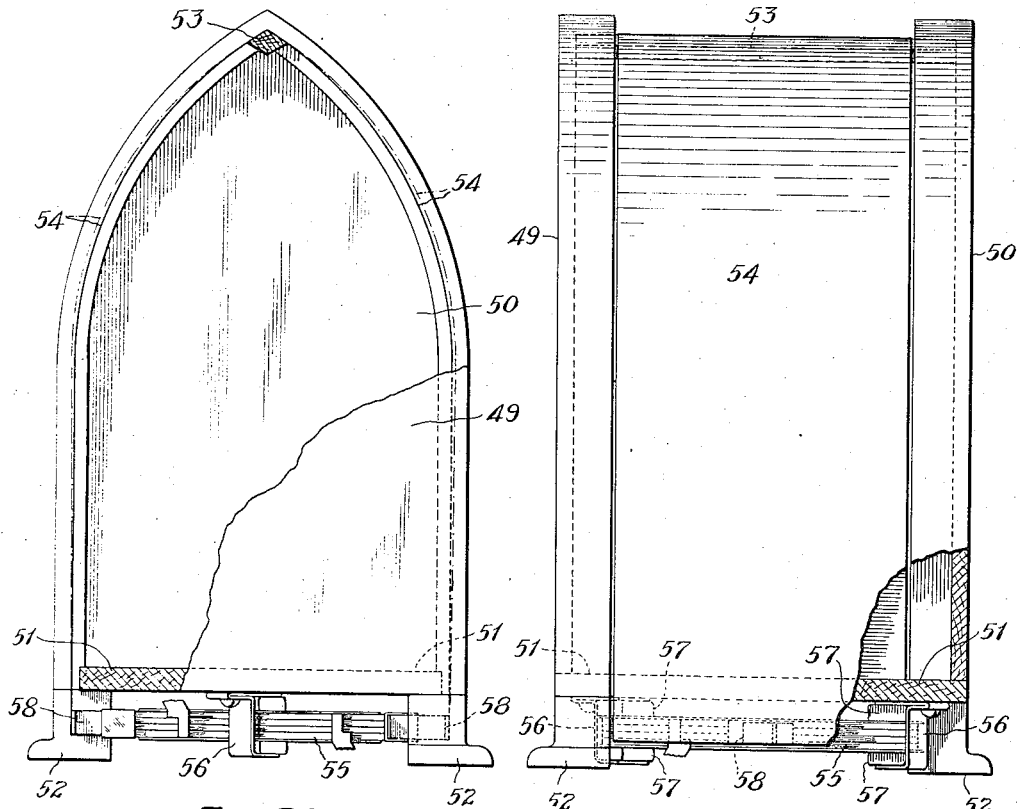
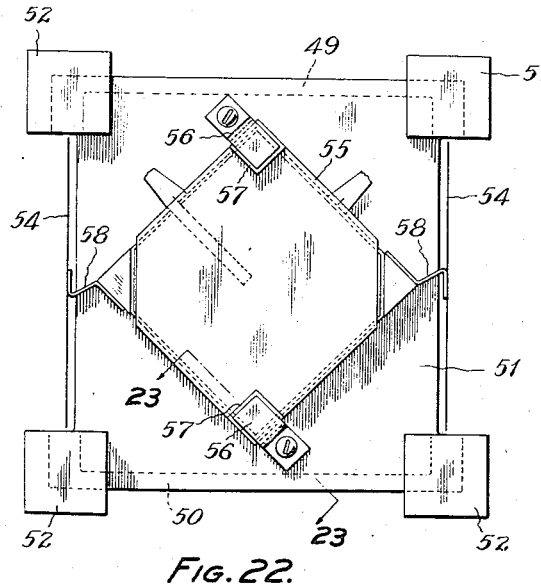
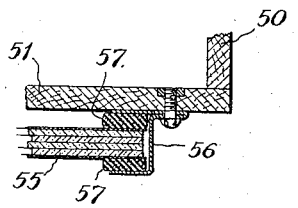

Patented Jan. 11, 1938

2,105,011

UNITED STATES PATENT OFFICE 2,105,011

PIEZO-ELECTRIC APPARATUS

Alfred L. W. Williams, Cleveland, Ohio, assignor to The Brush Development Company, Cleveland, Ohio, a corporation of Ohio Application April 14, 1934, Serial No. 720,593
Renewed January 16, 1937

15 Claims. (Cl. 171—327)

This invention relates to piezo-electric devices for conversion of mechanical into electrical energy or vice versa, and particularly to crystal units of the flexing type, such, for example, as are disclosed in United States Letters Patent No. 1,803,275 and Reissue No. 20,213.

One object of the invention is to provide an improved mounting for flexing crystal units.

Another object of the invention is to provide improved mounting and operative connections for crystal units of the character referred to with a view to producing a highly compact mechanism susceptible of being readily enclosed in a moisture-proof casing, simplifying the driving connections of the crystal unit and rendering the said unit more rugged and resistant to mechanical shock.

A further object of the invention is to provide a crystal unit construction characterized by a more equal distribution of stresses throughout the crystalline material of the unit and a minimizing of the mechanical stresses throughout the crystalline material of the unit, resulting in more faithful reproduction and a more efficient use of the crystalline material within the limits of its mechanical strength.

Other objects of the invention, more or less incidental or ancillary to the main objects already stated, will appear from the following specification describing specific embodiments of the invention for purposes of explanation and illustration.

In the drawings, Fig. 1 is a vertical sectional view of a piezo-electric mechanism and a loud speaker diaphragm actuated thereby.

Fig. 2 is an elevation of the piezo-electric unit and its enclosing casing, with the cover of the casing partially broken away to disclose details of construction.

Fig. 3 is an enlarged fragmentary view partly in elevation and partly in section showing a portion of the piezo-electric unit and enclosing casing and the lever actuated by the unit.

Fig. 4 is a section on the line 4—4 of Fig. 3.

Fig. 5 is a section on the line 5—5 of Fig. 3.

Fig. 6 is a fragmentary sectional elevation on the line 6—6 of Fig. 3.

Fig. 7 is an end elevation of the lever shown in Fig. 3.

Fig. 8 is a fragmentary sectional view showing a modified form of support for the crystal unit.

Fig. 9 is a fragmentary section on the line 9—9 of Fig. 8.

Fig. 10 is a front elevation of the crystal unit shown in Fig. 1, with its supporting blocks attached.

Fig. 11 is a side or edge elevation of said unit.

Fig. 12 is a top edge or plan view of the unit.

Fig. 13 is an enlarged fragmentary section on the line 13—13 of Fig. 10.

Fig. 14 is an expanded view of the crystal unit shown in the preceding figures.

Fig. 15 is a plan view of a microphone in which the crystal units are mounted in accordance with my invention.

Fig. 16 is a side or edge elevation of the microphone.

Fig. 17 is a section on the line 17—17 of Fig. 15.

Fig. 18 is a plan view of one of the crystal units of the microphone.

Fig. 19 is a side or edge elevation of said unit with the parts separated enough to show more clearly the construction.

Fig. 20 is a front elevation, partly in section, of a loud speaker of different type than that first described presenting an embodiment of my invention in modified form.

Fig. 21 is a side elevation of the same speaker with a portion of the structure broken away to disclose the interior construction.

Fig. 22 is a bottom view of the same speaker.

Fig. 23 is a fragmentary vertical section on the line 23—23 of Fig. 22.

Referring in detail to the constructions illustrated in the drawings and first to Figs. 1 to 14, inclusive, I designates in its entirety a metal casing consisting of a cup-shape body $1a$ which may conveniently be drawn or pressed from sheet metal and a cover plate $1b$ which is secured to the body of the casing by screws 2, 2. Enclosed within the casing I is a piezo-electric crystal unit designated in its entirety by 3. This unit comprises four crystalline plates 4, 5, 6, and 7. The construction of this unit is shown in Figs. 10 to 14, inclusive. The plates 4, 5, 6, and 7 are formed of crystalline material having the piezo-electric characteristics of Rochelle salt crystal and are preferably cut from a suitably grown crystal of Rochelle salt. The faces of the said plates are parallel to the plane of the major crystalline axes $b$ and $c$. One suitable orientation of the crystal plates relative to the electrical or $a$ axis and the relation of the sides or edges of the plates to the $c$ axis are shown by the arrows designated $a$ and $c$ associated with each of the plates in Fig. 14. As shown, the plates are uniform in size. They are provided with electrodes in the form of sheets of metal foil 8, 9, 10, and 11. The electrodes 8 and 10 are connected to one terminal conductor 12 and the electrodes 9 and 11 to the other terminal conductor 13, said conductors being in the form of thin metal tape. The upper corners of the electrodes are cut away as indicated in Fig. 14. The electrodes are intimately cemented to the crystal plates in known manner and the foiled plates are cemented together to form the crystal unit as shown in Figs. 10, 11, and 12. Protective sheets 14 and 15 of fiber or the like are cemented to the sides or faces of the unit. To the upper corner of the crystal unit is cemented a triangular metal cap 16 which carries a post 17 formed of elastic sheet metal adapted to readily flex.

As shown in Fig. 1, the inner bottom surface of the casing part 1a is lined with a sheet 18 of heavy paper or the like and a similar plate 19 covers the inner surface of the cover 1b of the casing and serves as a gasket between the cover and body 1a. The crystal unit 3 is operatively supported in the case 1 by three pairs of blocks 20, 21 interposed, respectively, between the cover of the casing and the front of the unit and between the back wall of the casing and the back of the unit. Each pair of blocks 20, 21 is disposed at one of the corners of the crystal unit, as clearly indicated in Fig. 2. The blocks 20, 21 are formed of material that is rather soft or yielding and preferably has slight elasticity. I have found material of the character used for rubber tire cement suitable for this purpose. A rather stiff mixture of this material, after being formed into blocks and exposed to the air until the solvent has evaporated, has the desired characteristics. As shown in Fig. 2, the side wall of the case 1 is formed with apertures 22, 23 within which are mounted suitable insulated bushings 24 and 25 through which are passed the conductors or leads 12 and 13 of the crystal unit. These leads are soldered to terminal brackets 26, 26 as shown in Fig. 2. The post 17 of the crystal unit projects through an aperture 1b' of the cover plate 1b, the aperture being effectively sealed around the post by a plug 27 which may be formed of material similar to that of the blocks 20, 21.

From an inspection of Fig. 14 it will be seen that the crystal plates are formed with their edges parallel to the crystal axes b and c. Consequently diagonals joining the corners of the crystal unit coincide with the axes of expansion and contraction of the crystal plates. Thus, as shown in Fig. 2, each pair of supporting blocks 20, 21 is disposed on one of these axes of expansion and contraction. When electromotive forces are applied to the electrodes of the crystal unit, the latter tend to flex with respect to two axes which are in planes at right angles to each other, in the manner explained in Patent 1,803,275. That is to say, if the crystal unit were supported and held at its center against movement normal to its faces, two diagonally opposite corners of the unit would tend to move in one direction normal to the plane of the unit while the other corners would tend to move in the opposite direction normal to the plane of the unit. With three of the corners held against such movement normal to the plane of the unit, the effect upon the free or top corner of the unit is additive and a maximum movement of that corner results.

To amplify the movement of the crystal, I mount on the cover 1b of the casing a lever 28. This lever as shown consists of a metal channel 29 in which is clamped a body 30 preferably formed of impregnated fiber which is both light and strong. The lever is pivotally supported on two posts 31 which are preferably formed of elastic material such as piano wire and which are soldered to the cover 1b and to the lever 28 in the manner indicated in Fig. 5 or otherwise suitably secured to said cover. The upper end of the lever 28 is connected, as by soldering, to the actuating post 17 of the crystal unit and the lower end of the lever is provided with a flexible actuating post 32 which, in Fig. 1, is shown operatively connected to a cone type diaphragm 33 of a loud speaker. At 34 (Fig. 1) is shown a portion of the frame which supports the cone, and the case of the crystal unit is rigidly secured to this frame. The screw bolts 2 of the case are made sufficiently long to pass through the frame 34 so that the screws serve the double purpose of holding the case body and cover together and securing the case to the frame.

It has been discovered that the flexing of multiple plate piezo-electric crystal units, and consequently also their fidelity of reproduction, is affected by the relation of the potential gradient through the unit to the strain of the crystalline material. That is to say, if the potential gradient through the unit is not proportional to the strain of the crystalline material there result unequal piezo-electric stresses in different parts of the crystal body and the setting up of mechanical stresses in said body which interfere with the free flexing of the body and thus unfavorably affect the fidelity of reproduction. Furthermore, the mechanical stresses set up in the manner referred to have the effect of reducing the mechanical strength of the unit and so tend to cause fracture from overloading. By my improved construction of unit above described I largely overcome these difficulties in a manner which is especially applicable to commercial production methods and which I shall now explain.

In the flexing of a multiple plate crystal unit it will readily be understood that the strain of the crystalline material increases from the median plane outward in each direction and is greatest in the outer planes of the unit. Accordingly, to attain a potential gradient proportional to these varying strains, it has been proposed to construct a four-plate crystal unit of the character shown in Fig. 13 of the said Patent 1,803,275 with the two inner plates thicker than the outer plates. This proposed construction gives good results but by my present invention I have sought to closely approximate these results by the use of crystalline plates of uniform thickness throughout the unit, thus simplifying and facilitating manufacture, with resultant minimizing of the cost of production. This result I attain by omitting the electrode foil between the two inner plates of the unit and suitably orienting said plates with respect to their crystalline axes and connecting the remaining foils, in the way illustrated in Fig. 14. In this manner, by a suitable choice of the thickness of the plates, a fairly good approximation to the desired result (a potential gradient proportional to the strain of the crystal material) is attained.

A piezo-electric device such as has been described has a number of desirable characteristics which will readily be appreciated by those skilled in this art. For one thing, the crystal unit, constructed and mounted in the manner described, has distinctive advantageous operating characteristics. By reason of the fact that the potential gradient throughout the unit is approximately proportional to the strain of the crystalline material, the piezo-electric capacity of said material is utilized more fully and efficiently without rupture of the unit and at the same time a more faithful reproduction is attained. The manner of mounting the crystal unit with four points of connection or reaction on the axes of expansion and contraction probably contributes to these results.

Again, the manner of mounting the crystal unit with three points of support in such a manner that the fourth reaction point has the maximum possible movement makes it possible to secure the desired amplification of this movement by a simple, sturdy and compact lever construction. The arrangement of this lever closely parallel to the wall of the case 1 and in radial relations to said case contributes to the marked compactness and permits the driving unit to be mounted coaxially with the cone of the speaker so that the entire structure is symmetrical and exceedingly compact. The manner in which the driving connection with the crystal unit is effected permits the enclosure of the crystal unit by a case of the compact form illustrated and is thus a contributing factor to the general compactness of the assembly. This same feature also contributes to the ease with which the crystal unit can be enclosed in a moisture-tight manner.

The entire piezo-electric device, including the amplifying lever, is remarkably sturdy for a device of this character. The complete enclosure of the crystal unit protects it from direct injury and the blocks 20, 21 provide a cushioned support for the unit which is so distributed as to minimize inertia stresses on the crystalline material in the shipping and handling of the device so that it is very little subject to injury from shock. The lever 28 by reason of its novel construction is remarkably strong and stiff for its weight and the flexible pivotal support and driving connections of the lever are exceedingly sturdy, though amply sensitive for the relatively small movements of the lever.

In Figs. 8 and 9 I have shown a modified form of supporting means in which the crystal unit 3' at each of the corners to be supported has cemented on its opposite sides triangular metal plates 35 formed with spherical or ball lugs 35a which are engaged by supporting plates 36 carried by insulation blocks 37 which are cemented to the adjacent walls of the casing 1'. Point supports of this kind hold the adjacent parts of the crystal unit effectively against movement normal to the faces of the unit without in any degree interfering with the desired flexing of the unit. However, substantially the same result is secured with the supporting blocks 20, 21 and the latter have the added advantage of better protecting the crystal unit against shock.

My improved mounting for piezo-electric crystal units is not limited to uses in which the unit converts electrical into mechanical energy, as in the case of the loud speaker above described, but is also applicable to uses where the reverse conversion is made, as in the case of microphones. By way of illustration I have shown in Figs. 15 to 19 a novel type of microphone in which my improved principle of mounting is employed.

In this microphone a pair of crystal units 38, 38 are mounted in parallel spaced relation in a frame-like support designated in its entirety by 39. This support is preferably formed of a material such as Bakelite and is provided with two inwardly projecting lugs 39a, 39a for the support of the crystal units 38, 38. The frame can conveniently be formed in three parts, as shown in Fig. 17, by stamping the parts from sheet material, the middle part being formed with the lugs 39a. The two crystal units are secured in position on the lugs by elastic cement at 39b and by sheets 40, 40 of suitable material, such as thin paper, which are cemented to the faces of the crystal units and to the top and bottom faces of the support 39.

As best shown in Figs. 18 and 19, each crystal unit consists of two plate-like elements 41 and 42, the plate 41 having metal foil electrodes 43 and 44 cemented on its outer and inner faces, respectively, and the plate 42 having electrodes 45 and 46 cemented on its outer and inner faces, respectively. The two plates thus foiled are cemented together and leads 47 and 48 are brought out from the outer and inner electrodes, respectively. The crystal plates 41 and 42 are formed parallel to the plane of the $b$ and $c$ axes of the crystal with the sides or edges of the plates disposed at 45 degrees to said $b$ and $c$ axes. Thus it will be seen that the crystal units are supported by the microphone frame or support at two points at the opposite ends of an axis of expansion and contraction.

In the operation of the microphone sound waves or other mechanical impulses in the surrounding medium acting upon the sides of the microphone result in a flexing of the crystal units with resultant generation of electromotive forces at their electrodes and such electromotive forces may be conducted away to actuate loud speakers or to perform other functions. In the operation of the microphone it may be considered that mechanical forces are applied to the two free ends of the crystal units causing them to flex. To be sure the sound waves act upon the central part of the crystal unit also but in principle the manner of supporting the crystal units on points of an axis of expansion and contraction is much the same as in the loud speaker unit first described.

In Figs. 20 to 23, inclusive, I have illustrated another form of loud speaker embodying my invention in a somewhat modified form. In this instance the speaker has two diaphragms and comprises a frame upon which said diaphragms and piezo-electric actuating element are mounted. The frame comprises front and rear walls 49 and 50, respectively, which rise from a bottom wall or floor 51, and four feet or pedestals 52, 52. The tops of the front and rear walls are connected by a cross bar 53. The two diaphragms 54, 54 are connected at their top ends to the cross bar 53 and at their lower ends are engaged and actuated by the piezo-electric unit in a manner which will presently be described.

The piezo-electric unit which is designated in its entirety by 55 is of substantially the same construction as the unit 3 first described. It comprises four crystalline plates formed, foiled and assembled in the same manner as in the case of the unit 3 except that driving means are applied at two corners of the unit instead of one corner thereof. As shown in the drawing, the unit is supported from the bottom of the floor 51 of the speaker frame or case by brackets 56, 56 with interposed blocks 57, 57 of yielding material similar to the blocks 20, 21 of the speaker first described. The other diagonally opposite corners of the crystal unit carry drive brackets 58, 58 which are attached to the lower ends of the diaphragms 54.

It will thus be seen that the crystal unit 55 in operation has four points of reaction of which two are provided by the fixed supporting brackets 56 at diagonally opposite corners of the unit while the two other points of reaction are provided by the drive connections 58 at the two other diagonally opposite corners of the unit. When the unit thus mounted is electrically energized it is flexed in a manner to vibrate the drive connections 58 in a direction substantially normal to the plane of the unit and simultaneously in the same direction, so that the lower ends of the diaphragms 54 are simultaneously raised and simultaneously lowered so as to cause a vibration of said diaphragms in unison, as indicated by the broken lines in Fig. 20. It will be seen that this movement of two parts of the crystal unit simultaneously in the same direction, which also characterized the crystal units of the microphone previously described, is here taken advantage of to secure an exceedingly simple drive for the two speaker diaphragms.

Various features of the embodiment of my invention shown in Figs. 15 to 19, inclusive, of the drawings are not claimed herein as they constitute the subject matter of a divisional application Serial No. 158,044, filed August 9, 1937.

It will be understood that my invention is not limited to the specific forms of construction herein illustrated and described and that the various features of the invention may take various other forms within the scope of the appended claims.

What I claim is:

1. In a piezo-electric device, a crystal unit comprising a plurality of parallel plates of crystalline material with two mutually intersecting axes of expansion and contraction, the faces of the plates being substantially parallel to the said axes and said unit being adapted to flex under the influence of electrostatic fields; and four operative connections for said unit comprising two connections disposed, respectively, substantially at the two ends of one of the two major axes of expansion and contraction of the unit and adapted to prevent substantial movement of the adjacent parts of the unit normal to its faces and further comprising a driving connection disposed substantially at one end of the other of said two axes and adapted to move with adjacent parts of the unit normal to its face.

2. In a piezo-electric device, a crystal unit comprising a plurality of parallel plates of crystalline material with two mutually intersecting axes of expansion and contraction, the faces of the plates being substantially parallel to the said axes and said unit being adapted to flex under the influence of electrostatic fields; and four operative connections for said unit comprising three connections disposed, respectively, substantially at the two ends of one and at one end of the other of the two major axes of expansion and contraction of the unit and adapted to prevent substantial movement of the adjacent parts of the unit normal to its faces and further comprising a driving connection disposed substantially at the other end of said other axis and adapted to move with the adjacent part of the unit normal to its face.

3. In a piezo-electric device, a crystal unit comprising a plurality of parallel plates of crystalline material with two mutually intersecting axes of expansion and contraction, the faces of the plates being substantially parallel to the said axes and said unit being adapted to flex under the influence of electrostatic fields; and four operative connections for said unit comprising two connections disposed, respectively, substantially at the two ends of one of the two major axes of expansion and contraction of the unit and adapted to prevent substantial movement of the adjacent parts of the unit normal to its faces and further comprising two driving connections disposed, respectively, substantially at the ends of the other of said two axes and adapted to move simultaneously in the same direction with the adjacent parts of the unit normal to its face.

4. In a piezo-electric device, a crystal unit comprising a plurality of parallel plates of crystalline material with two mutually intersecting axes of expansion and contraction, the faces of the plates being substantially parallel to the said axes and said unit being adapted to flex under the influence of electrostatic fields; and supporting means for the unit comprising two bodies of soft, non-rigid material disposed, respectively, substantially at the two ends of one of the major axes of expansion and contraction and adapted to prevent substantial movement of the adjacent parts of the unit normal to its faces.

5. In a piezo-electric device, a crystal unit comprising a plurality of parallel plates of crystalline material with two mutually intersecting axes of expansion and contraction, the faces of the plates being substantially parallel to the said axes and said unit being adapted to flex under the influence of electrostatic fields; and supporting means for the unit comprising bodies of soft, non-rigid material disposed, respectively, adjacent the two ends of one of the two major axes of expansion and contraction of the unit and one end of the other of said axes and adapted to prevent substantial movement of the adjacent parts of the unit normal to its faces.

6. In a piezo-electric device, a crystal unit comprising a plurality of parallel plates of crystalline material with two mutually intersecting axes of expansion and contraction, the faces of the plates being substantially parallel to the said axes and said unit being adapted to flex under the influence of electrostatic fields; and supporting means for the unit comprising two bodies of soft, slightly elastic material disposed, respectively, substantially at the two ends of one of the major axes of expansion and contraction and adapted to prevent substantial movement of the adjacent parts of the unit normal to its faces.

7. In a piezo-electric device, a crystal unit comprising a plurality of parallel plates of crystalline material with two mutually intersecting axes of expansion and contraction, the faces of the plates being substantially parallel to the said axes and said unit being adapted to flex under the influence of electrostatic fields; and supporting means for the unit comprising bodies of soft, slightly elastic material disposed, respectively, adjacent the two ends of one of the two major axes of expansion and contraction of the unit and one end of the other of said axes and adapted to prevent substantial movement of the adjacent parts of the unit normal to its faces.

8. In a piezo-electric device, a crystal unit comprising a plurality of parallel plates of crystalline material with two mutually intersecting axes of expansion and contraction, the faces of the plates being substantially parallel to the said axes and said unit being adapted to flex under the influence of electrostatic fields; a rigid case enclosing the unit with clearance to permit flexing of the unit; means for supporting the unit on the case at a plurality of points each of which is on a major axis of expansion and contraction of the unit and adjacent the periphery of the unit; and means actuated by the unit comprising a connection extending through an aperture in the wall of the case and secured to a free peripheral part of the unit on one of its two major axes of contraction and expansion and adapted to transmit movement of the crystal unit on lines normal to the plane thereof.

9. In a piezo-electric device, a crystal unit comprising a plurality of parallel plates of crystalline material with two mutually intersecting axes of expansion and contraction, the faces of the plates being substantially parallel to the said axes and said unit being adapted to flex under the influence of electrostatic fields; a rigid case enclosing the unit with clearance to permit flexing of the unit; means for supporting the unit on the case at three points each of which is on a major axis of expansion and contraction of the unit and adjacent the periphery of the unit; and a connection actuated by the unit extending through an aperture in the wall of the case and secured to a free peripheral part of the unit on one of its two major axes of contraction and expansion and adapted to transmit movement of the crystal unit on lines normal to the plane thereof.

10. In a piezo-electric device, a crystal unit comprising a plurality of parallel plates of crystalline material with two mutually intersecting axes of expansion and contraction, the faces of the plates being substantially parallel to the said axes and said unit being adapted to flex under the influence of electrostatic fields; a rigid case enclosing the unit with clearance to permit flexing of the unit; means for supporting the unit on the case at a plurality of points each of which is on a major axis of expansion and contraction of the unit and adjacent the periphery of the unit; and means actuated by the unit comprising a connection extending through an aperture in the wall of the case and secured to a free peripheral part of the unit on one of its two major axes of contraction and expansion and adapted to transmit movement of the crystal unit on lines normal to the plane thereof, and a lever pivoted on an outer face of the case and operatively joined to the said connection.

11. In a piezo-electric device, a crystal unit comprising a plurality of parallel plates of crystalline material with two mutually intersecting axes of expansion and contraction, the faces of the plates being substantially parallel to the said axes and said unit being adapted to flex under the influence of electrostatic fields; a flat, rigid case enclosing the unit with clearance to permit flexing of the unit; means for supporting the unit on the case at a plurality of points each of which is on a major axis of expansion and contraction of the unit and adjacent the periphery of the unit; and means actuated by the unit comprising a connection extending through an aperture in one of the flat walls of the case and secured to a free peripheral part of the unit on one of its two major axes of expansion and contraction and adapted to transmit movement of the crystal unit on lines normal to the plane thereof, and a lever pivoted on the outer side of the said flat wall of the case, said lever being disposed substantially parallel to the said wall and joined at one end to the said connection of the crystal unit.

12. In a piezo-electric device, a crystal unit comprising a plurality of parallel plates of crystalline material with two mutually intersecting axes of expansion and contraction, the faces of the plates being substantially parallel to the said axes and said unit being adapted to flex under the influence of electrostatic fields; a flat, rigid case enclosing the unit with clearance to permit flexing of the unit; means for supporting the unit on the case at three points, two of which are adjacent the ends of one of the two major axes of expansion and contraction of the unit and the other of which is adjacent an end of the other of said axes; a connection extending through an aperture in one of the flat walls of the case and secured to a peripheral part of the crystal unit adjacent the other end of the last mentioned axis of contraction and expansion, and a lever pivoted on the outer side of said flat wall with one end disposed adjacent the periphery of the case and joined to the said connection and its other end disposed adjacent the central part of the said flat wall.

13. In a multiple plate piezo-electric crystal unit of the flexing type, the combination of four superposed plates of substantially equal thickness formed of crystalline material having substantially the piezo-electric characteristics of Rochelle salt, said plates being disposed with the similar major crystalline axes of adjacent plates at right angles to each other; an internal electrode between each interior plate and the adjacent outer plate; an electrode on the outer side of each outer plate; terminal conductors of one polarity connecting together one outer electrode and the farthest removed inner electrode; and terminal conductors of the opposite polarity connecting together the other outer electrode and the other inner electrode.

14. In a piezo-electric device, a crystal unit comprising a plurality of parallel plates of crystalline material with two mutually intersecting axes of expansion and contraction, the faces of the plates being subtsantially parallel to the said axes and said unit being adapted to flex under the influence of electrostatic fields; and supporting means for the unit disposed to engage the unit substantially at the two ends of one of the major axes of expansion and contraction and adapted to prevent substantial movement of the adjacent parts of the unit normal to its faces while permitting such movement of other parts of the unit.

15. In a piezo-electric device, a crystal unit comprising a plurality of parallel plates of crystalline material with two mutually intersecting axes of expansion and contraction, the faces of the plates being substantially parallel to the said axes and said unit being adapted to flex under the influence of electrostatic fields; and said supporting means for the unit disposed to engage the unit substantially at the two ends of one of the major axes of expansion and contraction of the unit and one end of the other of said axes and adapted to prevent substantial movement of the adjacent parts of the unit normal to its faces while permitting such movement of other parts of the unit.

ALFRED L. W. WILLIAMS.

CERTIFICATE OF CORRECTION.

Patent No. 2,105,011. January 11, 1938.

ALFRED L. W. WILLIAMS.

It is hereby certified that error appears in the printed specification of the above numbered patent requiring correction as follows: Page 3, first column, line 15, for "relations" read relation; second column, line 48, after "and" insert a; page 5, second column, line 59, claim 15, strike out the word "said"; and that the said Letters Patent should be read with these corrections therein that the same may conform to the record of the case in the Patent Office.

Signed and sealed this 8th day of March, A. D. 1938.

(Seal)

Henry Van Arsdale,
Acting Commissioner of Patents.